US012675207B1

(12) United States Patent
Sharma

(10) Patent No.: US 12,675,207 B1
(45) Date of Patent: Jul. 7, 2026

(54) HIERARCHICAL DISCUSSION INTERFACE SYSTEM WITH BIDIRECTIONAL COMMENT STREAMING AND CENTRAL INPUT ROUTING

(71) Applicant: Puneet Sharma, San Jose, CA (US)

(72) Inventor: Puneet Sharma, San Jose, CA (US)

( * ) Notice: Subject to any disclaimer, the term of this patent is extended or adjusted under 35 U.S.C. 154(b) by 27 days.

(21) Appl. No.: 19/361,132

(22) Filed: Oct. 17, 2025

(51) Int. Cl.
*G06F 3/0482* (2013.01)
*G06F 3/04842* (2022.01)
*G06F 3/04886* (2022.01)
*G06Q 50/00* (2024.01)

(52) U.S. Cl.
CPC ........ *G06F 3/0482* (2013.01); *G06F 3/04842* (2013.01); *G06F 3/04886* (2013.01); *G06Q 50/01* (2013.01)

(58) Field of Classification Search
None
See application file for complete search history.

(56) References Cited

U.S. PATENT DOCUMENTS

2011/0191406 A1* 8/2011 Plunkett ................. G06Q 50/01
709/203
2014/0025692 A1* 1/2014 Pappas .................. G06F 16/287
707/754

2014/0201201 A1* 7/2014 Song ................... G06F 16/9577
707/723
2014/0280649 A1* 9/2014 Soukka ................. H04L 51/224
709/206
2020/0252692 A1* 8/2020 Kawakami ............ G06F 3/0484
2020/0260137 A1* 8/2020 Chen ................ H04N 21/47217
2021/0133681 A1* 5/2021 Dhaliwal ............. G06Q 10/101
2023/0370685 A1* 11/2023 Su ...................... H04N 21/4318
2025/0324139 A1* 10/2025 Li ...................... H04N 21/4788

* cited by examiner

*Primary Examiner* — Linda Huynh

(57) ABSTRACT

A computer-implemented discussion interface system enables structured discourse between hierarchically differentiated user groups through a novel architectural arrangement. The system presents a graphical user interface with a first comment stream region positioned above a second comment stream region, with a shared input element positioned between them. A user classification module assigns users to hierarchical groups based on profile data analysis and classification criteria. A comment routing module receives text input through the central input element and directs display to either the upper or lower comment stream region based on the user's hierarchical group assignment. Comments from first group users move upward from the input element while comments from second group users move downward, creating bidirectional visual flow.

20 Claims, 6 Drawing Sheets

100

Figure 6:
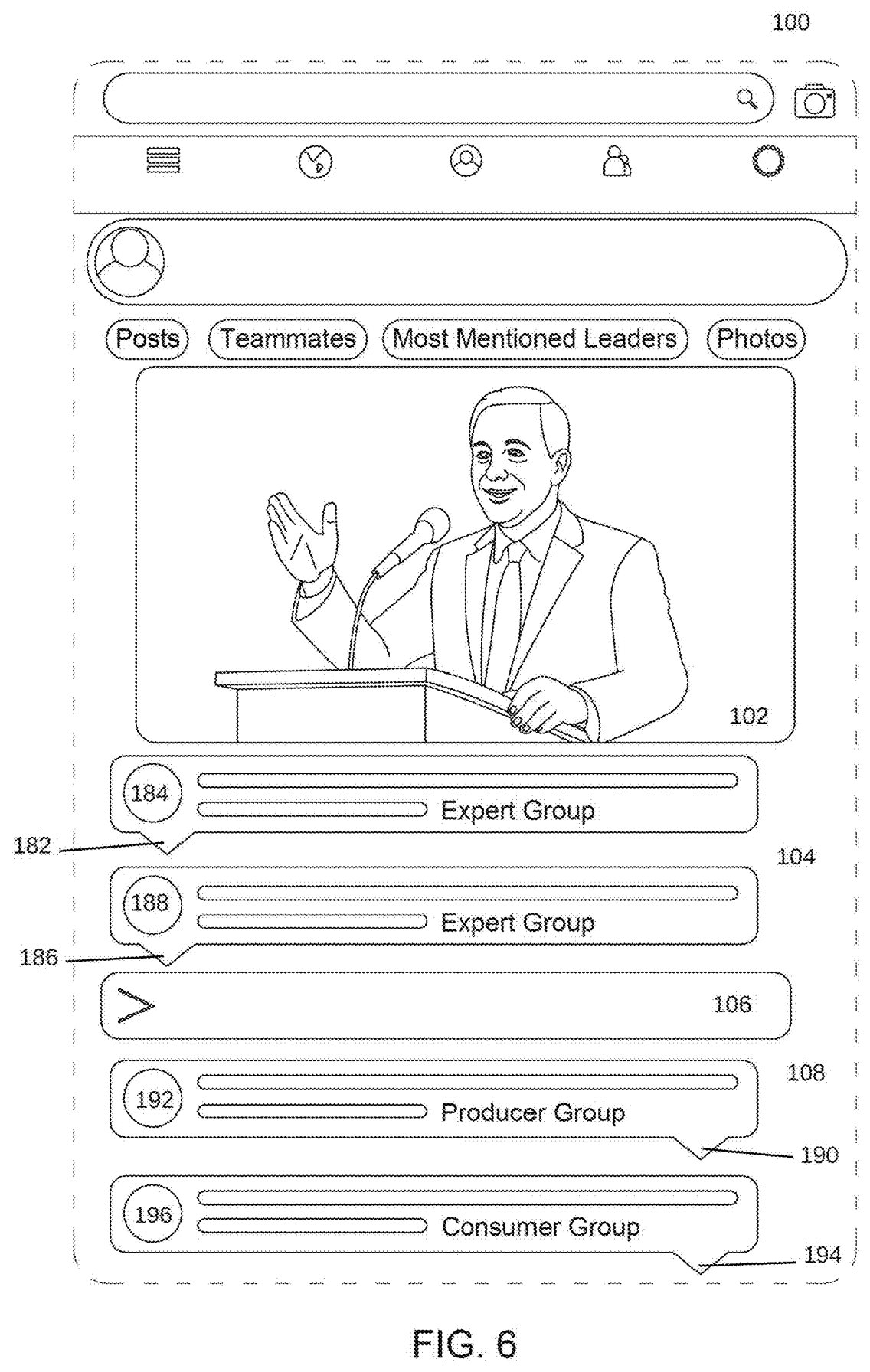

100

Posts    Teammates    Most Mentioned Leaders    Photos

102

184    Expert Group

182

104

188    Expert Group

186

>

106

108

192    Producer Group

190

196    Consumer Group

HIERARCHICAL DISCUSSION INTERFACE SYSTEM WITH BIDIRECTIONAL COMMENT STREAMING AND CENTRAL INPUT ROUTING

FIELD OF INVENTION

The present invention relates generally to computer-implemented discussion interfaces and communication systems. More particularly, the invention relates to graphical user interface architectures that enable structured discourse.

BACKGROUND

Online discussion platforms and social networking systems have become essential tools for public discourse, enabling millions of users to engage in conversations about topics ranging from current events to specialized professional subjects. These platforms typically implement linear comment systems where responses appear chronologically beneath an original post, with some systems incorporating threading capabilities to show reply relationships through visual indentation. However, as discussion threads grow to include dozens or hundreds of participants, the resulting comment streams become increasingly difficult to navigate, with valuable insights often buried among less substantive contributions, and users struggling to identify content most relevant to their interests or expertise level.

The challenge of managing information overload in online discussions has prompted various attempts to improve comment organization and presentation. Some systems have implemented voting mechanisms that allow community members to promote or demote comments based on perceived value, while others employ algorithmic ranking that considers factors such as user engagement metrics, social relationships, or keyword relevance to reorder comments for individual viewers. Additionally, certain platforms have introduced collapsible threading structures that allow users to hide or expand conversation branches, and filtering options that enable viewers to sort comments by various criteria such as timestamp, popularity, or author reputation. Despite these improvements, fundamental limitations remain in how discussions are structured, particularly when conversations involve participants with vastly different levels of expertise, authority, or stake in the subject matter being discussed.

The increasingly important role of online discussions in professional contexts, corporate communications, and public policy debates has highlighted the need for more sophisticated conversation architectures that can accommodate hierarchical participant structures. In many real-world scenarios, discussions naturally involve distinct groups of participants with different roles, perspectives, and information needs. For instance, corporate earnings calls involve company executives presenting to analysts and investors, academic conferences feature presenters addressing audiences of varying expertise levels, and public forums often include both subject matter experts and interested laypeople. Current discussion platforms fail to adequately reflect these natural hierarchies, instead treating all participants as functionally equivalent within a flattened conversation structure that obscures important distinctions in authority, expertise, or organizational position.

Recent developments in enterprise communication systems have attempted to address some aspects of hierarchical communication through role-based permissions and channel structures. U.S. Pat. No. 10,085,141 describes a system for hierarchical communication channels designed for emergency response organizations, implementing multi-level organizational hierarchies with distinct roles such as owners, moderators, and members. This system allows for the creation of communication groups based on organizational structure, with visual hierarchy displays using indentation to show relationships between different levels. However, this approach maintains separate input mechanisms for each hierarchical group, requiring users to navigate between different channels or groups to participate in or monitor multiple conversation streams. The system lacks any means for simultaneous participation across hierarchical boundaries and does not provide a unified interface that allows participants to engage with both their peer group and other hierarchical levels within a single integrated conversation flow. Furthermore, the focus on emergency response scenarios results in rigid hierarchical structures that cannot dynamically adapt to the fluid nature of public discussions where participant roles may be context-dependent or evolve during the course of a conversation.

The limitations of existing discussion systems become particularly acute in scenarios requiring asymmetric information exchange between groups with different knowledge levels or decision-making authority. Current platforms provide no effective mechanism for structuring conversations where certain participants need to demonstrate thought leadership while others primarily seek to learn, or where regulatory or professional considerations require maintaining clear distinctions between authoritative statements and general discussion. The absence of architectural innovations in discussion interface design has resulted in platforms that either completely flatten hierarchical distinctions, losing valuable context about participant authority and expertise, or rigidly separate different user groups into isolated channels, preventing the cross-pollination of ideas and insights that can emerge from structured inter-group dialogue. These shortcomings have created a clear need for novel approaches to discussion architecture that can maintain hierarchical distinctions while facilitating controlled interaction between different participant groups.

It is within this context that the present invention is provided.

SUMMARY

The present invention provides a computer-implemented discussion interface system that enables structured dialogue between hierarchically differentiated user groups through a novel architectural arrangement. The system comprises a graphical user interface with a first comment stream region positioned in an upper portion, a second comment stream region positioned in a lower portion, and a centrally-positioned input element between these regions. A user classification module automatically assigns users to hierarchical groups based on profile data analysis and classification criteria, while a comment routing module directs user-submitted text from the shared input element to either the upper or lower comment stream region based on the user's hierarchical group assignment. Comments from users in different hierarchical groups move in opposite vertical directions relative to the central input element, creating a bidirectional flow pattern where first group comments move upward and second group comments move downward. The system maintains viewing permissions that allow users from both groups to observe the full discussion while controlling submission privileges based on group assignment, thereby facilitating asymmetric information exchange and structured discourse between participants of different standing.

The technical architecture provides several advantages over conventional linear discussion systems by spatially organizing conversations to reflect natural hierarchies while maintaining unified discussion continuity through the shared input mechanism. The bidirectional flow visualization immediately conveys the hierarchical relationship between participant groups while the central input element serves as both a functional entry point and a visual boundary that reinforces group distinctions without completely isolating the conversation streams.

In some embodiments, the classification criterion comprises a quantitative threshold value applied to numerical metrics extracted from user profile data, enabling objective and automated user categorization. This eliminates manual group assignment overhead and ensures consistent application of hierarchy rules across large user populations while allowing the system to scale efficiently.

In further embodiments, the numerical metrics include market capitalization values, gross domestic product values, revenue values, asset values, follower counts, subscriber counts, experience level indicators, or credential scores. This flexibility allows the system to adapt to various discussion contexts, from financial forums where market cap determines authority to educational platforms where credentials establish expertise levels.

In yet further embodiments, users are classified into groups based on whether their metric values exceed or fall below predetermined thresholds. This binary classification creates clear group boundaries that simplify both system implementation and user understanding of their participation role within the discussion hierarchy.

In some embodiments, the comment routing module applies temporal delays between input submission and display. This feature enables moderation workflows, allows for content filtering, and can create anticipation effects that enhance user engagement with the platform.

In further embodiments, the input element comprises a text entry field spanning the full horizontal width between comment regions. This design maximizes input visibility, reinforces the architectural symmetry of the interface, and provides an intuitive interaction point that clearly demarcates the boundary between hierarchical discussion spaces.

In yet further embodiments, comments move upward from the input element in the first stream and downward in the second stream. This opposing directional flow creates an immediately recognizable visual metaphor for hierarchical relationships while efficiently utilizing screen space for concurrent conversation display.

In some embodiments, visibility controls restrict viewing permissions asymmetrically between groups. Users in the first hierarchical group can view both comment streams while second group users see only their peer discussions, facilitating knowledge transfer from authority figures to broader audiences while maintaining focused peer-level dialogue.

In further embodiments, the system includes nested discussion capabilities that generate child discussion interfaces maintaining the same hierarchical structure. This recursive architecture allows for topic branching while preserving group dynamics, enabling detailed exploration of specific points without losing the hierarchical context.

In yet further embodiments, animation modules provide visual transitions including fade-in effects, sliding motions, scaling transformations, and opacity changes. These transitions enhance user experience by making comment flow more visually appealing and helping users track new content as it enters the discussion space.

In some embodiments, display area allocation between comment regions adjusts dynamically based on comment volume. This responsive design ensures optimal use of screen real estate and prevents one stream from dominating the interface when discussion activity is imbalanced.

In further embodiments, verification modules authenticate user profile data before classification. This security feature prevents gaming of the hierarchy system and ensures that group assignments reflect legitimate user credentials or characteristics.

In yet further embodiments, the routing module can parse text for keywords and override standard hierarchical routing. This capability allows for special message types, system announcements, or cross-hierarchy communications when specific circumstances warrant deviation from normal flow patterns.

In some embodiments, moderation modules review and approve comments from second group users while allowing immediate display from first group users. This differentiated moderation approach maintains discussion quality while recognizing the presumed authority and accountability of higher-tier participants.

In further embodiments, visual indicators distinguish comments from different hierarchical groups through color coding, border styling, background shading, icon badges, or typography variations. These visual cues help users quickly identify comment sources and understand the hierarchical context of each contribution.

In yet further embodiments, statistics modules track and display interaction metrics adjacent to the input element. This feature provides real-time feedback on discussion dynamics and can help both users and administrators understand engagement patterns across hierarchical groups.

In some embodiments, the classification module periodically re-evaluates user data and dynamically reassigns group membership. This adaptation mechanism ensures that hierarchy assignments remain current as user credentials or characteristics change over time.

In further embodiments, thread connection modules create visual links between related comments across the hierarchy divide using graphical connectors. This feature helps users trace conversation threads that span both comment streams, maintaining discussion coherence despite the spatial separation of hierarchical groups.

BRIEF DESCRIPTION OF THE DRAWINGS

Various embodiments of the invention are disclosed in the following detailed description and accompanying drawings.

5

Figure 4:
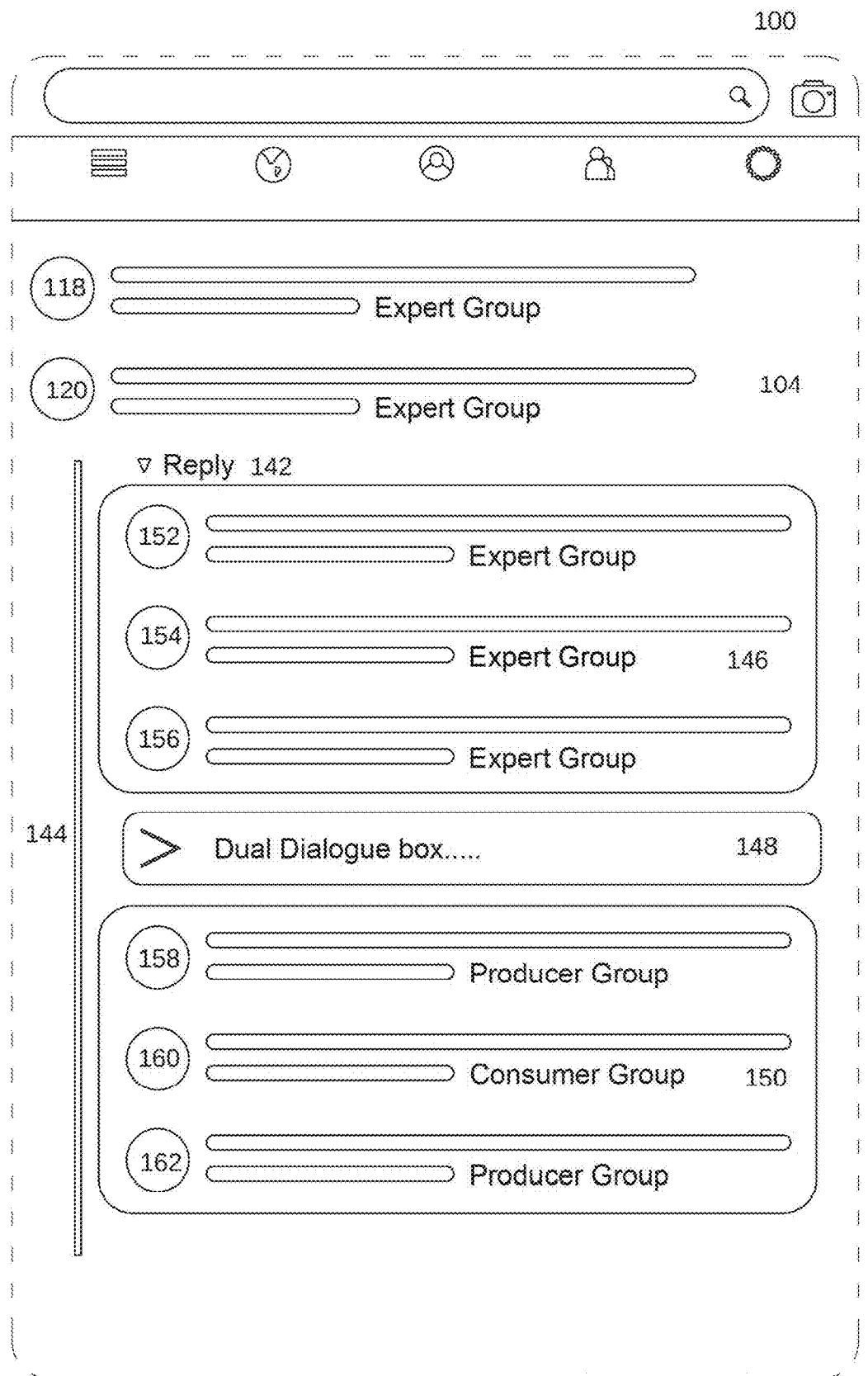

FIG. 4 illustrates an example of the discussion interface system implementing nested discussions where a reply thread maintains the same bifurcated architecture within a parent comment.

Figure 5:
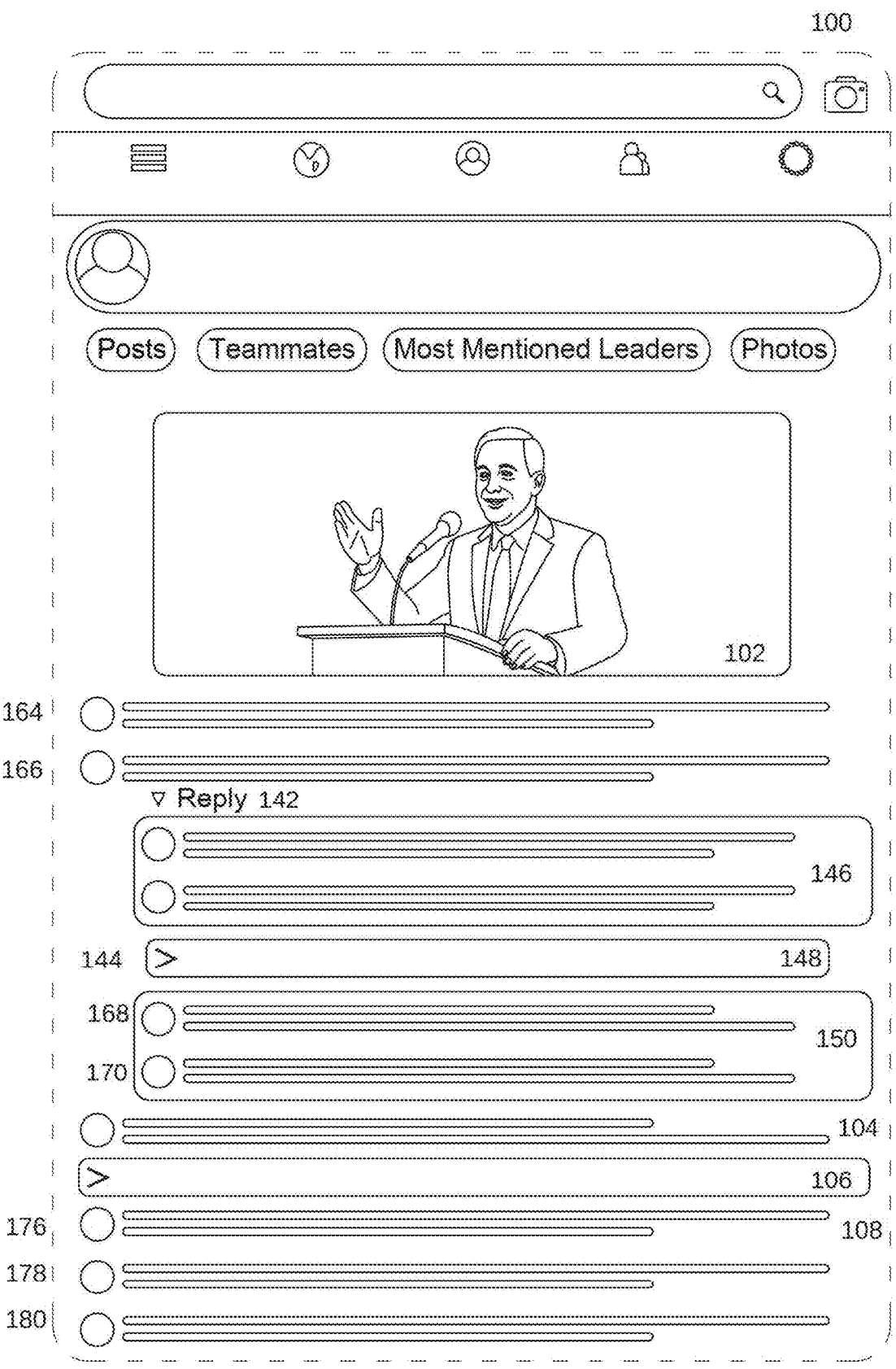

FIG. 5 illustrates an example of the discussion interface system during active use with multiple comments populating both parent-level streams and an expanded nested discussion thread.

FIG. 6 illustrates an example of the discussion interface system with an alternative visual embodiment featuring angular comment containers and directional flow indicators emphasizing the bidirectional architecture.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

DEFINITIONS

The terminology used herein is for the purpose of describing particular embodiments only and is not intended to be limiting of the invention.

As used herein, the term "and/or" includes any combinations of one or more of the associated listed items.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The term "comment stream region" refers to a defined area within a graphical user interface designated for displaying user-generated text comments or other content items in a continuous or semi-continuous flow. This includes, but is not limited to, scrollable display areas, fixed-height containers with overflow handling, dynamically expanding regions, or viewport-restricted zones that can accommodate multiple comment entries. In one example implementation, a comment stream region may be rendered as a DIV element in HTML with CSS properties defining its boundaries, scroll behavior, and visual styling, configured to display comments as individual DOM elements that are programmatically inserted and positioned within the container.

The term "input element" refers to any user interface component capable of receiving text input from a user through keyboard entry, voice-to-text conversion, touch-based input methods, or other text generation means. This includes, but is not limited to, HTML input fields, textarea elements, contenteditable divisions, rich text editors, or custom-built text entry components implemented in various programming frameworks. In one example implementation, the input element may be a textarea HTML element with event listeners for keypress detection, auto-resize functionality based on content length, and submission triggers activated through enter key detection or button click events.

The term "hierarchical group" refers to a classification category within an ordered system where different groups possess different levels of authority, privilege, access rights, or standing relative to other groups in the hierarchy. This includes, but is not limited to, organizational tiers, permission levels, user roles, membership classes, or stratified categories based on quantifiable metrics. In one example implementation, hierarchical groups may comprise "Leader" and "Follower" categories determined by whether a user's associated company market capitalization exceeds $10 billion, or "Expert" and "Novice" categories based on professional certification scores exceeding predetermined thresholds.

The term "user classification module" refers to a software component, algorithm, or system process that analyzes user-related data to assign users to appropriate categories or groups. This includes, but is not limited to, rule-based classification engines, machine learning classifiers, threshold-based sorting algorithms, or API-based verification services. In one example implementation, the user classification module may be implemented as a Node.js microservice that queries external databases for user metrics, applies configurable threshold rules stored in JSON format, and returns group assignments through RESTful API endpoints.

The term "comment routing module" refers to a software component that directs the display or storage of user-generated content to appropriate destinations based on predetermined routing logic. This includes, but is not limited to, message queue systems, event-driven routers, conditional branching logic, or publish-subscribe pattern implementations. In one example implementation, the comment routing module may be implemented using WebSocket connections that receive comment data, evaluate user group assignments stored in session variables, and emit targeted events to specific client-side listeners responsible for rendering comments in designated stream regions.

The term "visual movement" refers to the perceived or actual motion of displayed elements within a user interface, whether through animation, positional updates, or sequential rendering that creates an impression of directional flow. This includes, but is not limited to, CSS transitions, JavaScript-based animations, frame-by-frame position updates, or scroll-based effects. In one example implementation, visual movement may be achieved through CSS transform properties with translateY values that incrementally adjust element positions over time, creating smooth upward or downward motion effects at rates of 50-200 pixels per second.

The term "user profile data" refers to information associated with a user account that can be used to determine user characteristics, credentials, affiliations, or metrics. This includes, but is not limited to, demographic information, professional credentials, social media metrics, financial data, organizational affiliations, activity histories, or verified documentation. In one example implementation, user profile data may be stored in a PostgreSQL database with tables containing user IDs, company affiliations linked to market capitalization data from financial APIs, verification timestamps, and credential scores calculated from weighted combinations of experience years, certification levels, and peer endorsements.

The system components described herein may be implemented using various programming languages and frameworks suitable for web-based or application-based deployment. Server-side components may be implemented in languages such as Python, Java, C#, Node.js, or Go, utilizing frameworks such as Django, Spring Boot, .NET Core, Express.js, or Gin. Client-side components may be implemented using JavaScript, TypeScript, or WebAssembly, with frameworks such as React, Angular, Vue.js, or vanilla JavaScript with modern DOM manipulation APIs. Database systems may include relational databases such as PostgreSQL, MySQL, or Microsoft SQL Server, or non-relational databases such as MongoDB, Redis, or DynamoDB, depending on specific performance and scalability requirements.

Communication between system components may utilize various protocols and data formats appropriate for real-time or near-real-time message transmission. This includes Web-Socket connections for bidirectional communication, Server-Sent Events for unidirectional server-to-client streaming, HTTP/2 for multiplexed request-response patterns, or GraphQL subscriptions for selective data updates. Data serialization may employ JSON for human-readable format compatibility, Protocol Buffers for efficient binary encoding, or MessagePack for balanced performance and compatibility. Authentication and authorization mechanisms may include JWT tokens, OAuth 2.0 flows, API keys, or session-based authentication, with encryption provided through TLS/SSL protocols for data in transit and AES encryption for data at rest.

The graphical user interface rendering may be accomplished through various display technologies and rendering engines. Web-based implementations may utilize HTML5 Canvas elements for custom graphics rendering, SVG for scalable vector graphics, or standard DOM elements styled with CSS Grid or Flexbox layouts. Desktop applications may employ native UI frameworks such as Electron with Chromium rendering, Qt for cross-platform compatibility, or platform-specific frameworks such as WPF for Windows, Cocoa for macOS, or GTK for Linux. Mobile implementations may use React Native for cross-platform development, native iOS development with Swift and UIKit, or native Android development with Kotlin and Jetpack Compose.

Unless expressly stated otherwise, words such as "a," "an," and "the" are intended to include both singular and plural forms, and the term "about" is intended to accommodate ±10% variations in stated values. Recitation of a range inherently includes all sub-ranges and individual values within that range. All exemplary materials, temperatures, and dimensions may be interchanged with other functionally equivalent counterparts unless contradicted by express language. The scope of the invention should therefore be construed in light of the appended claims, with these passages serving only to illustrate representative but non-limiting embodiments.

DESCRIPTION OF DRAWINGS

The present invention provides a computer-implemented discussion interface system that fundamentally restructures how online discussions occur between participants of different hierarchical standing through a novel architectural arrangement comprising vertically-separated comment streams with a centrally-positioned shared input element. Unlike conventional linear threading systems where all comments flow in a single direction beneath an original post, or existing hierarchical communication systems that isolate different user groups into separate channels with independent input mechanisms, the present invention creates a unified discussion framework where participants from different hierarchical groups contribute through a single shared input element while their comments are automatically routed to spatially-distinct regions based on their group classification. This architecture addresses the critical limitations of prior art systems that either completely flatten hierarchical distinctions in discussion platforms, losing valuable context about participant authority and expertise, or rigidly separate different user groups into isolated communication channels, preventing the beneficial cross-pollination of ideas between hierarchical levels.

The invention solves the long-standing problem of information overload in online discussions by spatially organizing comments according to participant hierarchy while maintaining discussion continuity through the shared input mechanism. The bidirectional flow pattern, where comments from higher-tier participants move upward from the central input element while comments from other participants move downward, creates an immediately recognizable visual metaphor for hierarchical relationships without requiring users to navigate between separate interfaces or channels. This spatial organization enables users to quickly identify and focus on content most relevant to their interests or expertise level while still maintaining awareness of the broader discussion context, thereby reducing the cognitive load associated with parsing through undifferentiated comment streams in conventional systems.

Furthermore, the invention addresses the asymmetric information exchange requirements common in professional, educational, and public policy contexts where certain participants serve as thought leaders or authoritative sources while others primarily seek to learn or follow developments. The system's ability to automatically classify users based on objective criteria such as market capitalization, credentials, or other quantifiable metrics eliminates the manual overhead and potential bias associated with role assignment in traditional hierarchical communication systems. By implementing viewing permissions that allow higher-tier participants to observe both comment streams while potentially restricting lower-tier participants to their peer discussions, the system facilitates controlled knowledge transfer from authority figures to broader audiences while maintaining focused peer-level dialogue that might otherwise be inhibited by the presence of authority figures.

The technical implementation overcomes the architectural rigidity of prior art hierarchical communication systems, such as those designed for emergency response organizations, which require users to navigate between entirely separate channels or groups to participate in or monitor multiple conversation streams. Instead of maintaining separate input mechanisms for each hierarchical group, which fragments the user experience and complicates cross-hierarchy communication, the present invention's central shared input element serves as both a functional entry point and a visual boundary that reinforces group distinctions without completely isolating the conversation streams. This unified input approach ensures that all participants engage with the same discussion interface, reducing the learning curve and technical complexity associated with multi-channel communication systems while enabling seamless transitions between peer-level and cross-hierarchy interactions.

The invention's scalability advantages become particularly apparent in large-scale discussions involving hundreds or thousands of participants, where traditional flat comment systems become unwieldy and existing hierarchical systems require extensive administrative overhead to manage multiple channels and permission structures. The automated classification and routing mechanisms enable the system to handle dynamic user populations efficiently, automatically adapting to new participants and changing user characteristics without manual intervention. The visual separation of comment streams also provides natural load balancing for user attention, preventing the overwhelming effect common in high-volume discussions while ensuring that valuable contributions from authoritative sources remain visible and accessible to all permitted viewers. These technical advantages, combined with the intuitive visual metaphor of opposing directional flows, create a discussion platform that better reflects and facilitates the natural hierarchical dynamics present in many real-world communication scenarios.

Figure 1:
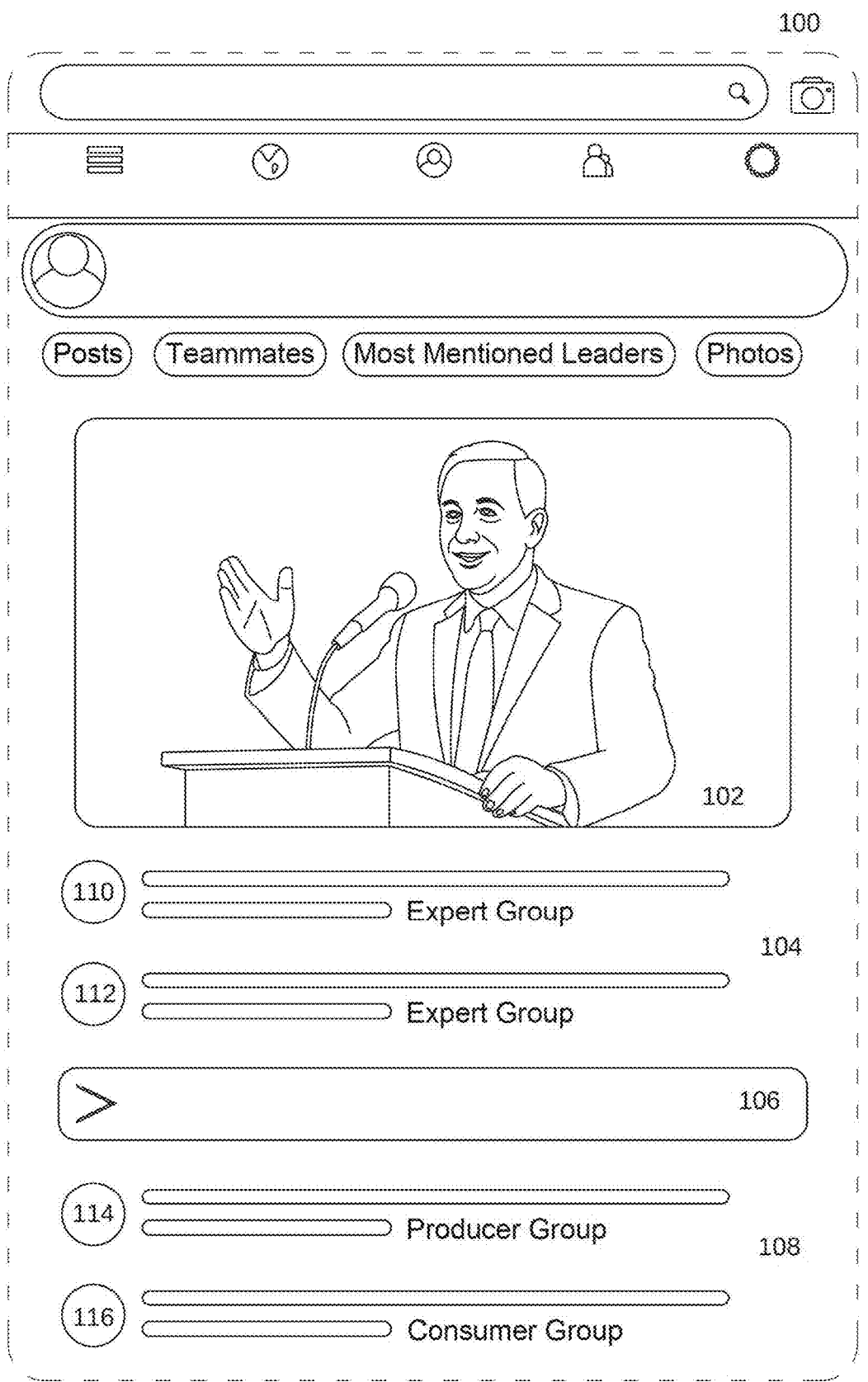
FIG. 1 illustrates an example of the discussion interface system deployed beneath social media content with expert group comments positioned above a central input element and producer/consumer group comments positioned below.

FIG. 1 illustrates a discussion interface system 100 implementing the hierarchical discussion architecture of the present invention within a mobile device display context. The system 100 comprises a main content display region 102 presenting video or multimedia content, beneath which the novel bifurcated comment architecture is deployed. The main content display region 102 may display various content types including but not limited to video presentations, live streams, recorded conferences, news articles, blog posts, image galleries, or any multimedia content serving as the discussion topic. In alternative embodiments, the main content display region 102 may be omitted entirely, with the discussion interface system 100 functioning as a standalone forum or discussion platform focused solely on text-based topic headers or minimal content prompts.

The central input element 106 is positioned between a first comment stream region 104 and a second comment stream region 108, establishing the fundamental architectural division that characterizes the invention. The central input element 106 may be implemented as an HTML textarea element, a contenteditable div, a rich text editor supporting formatted input, or any suitable text entry component capable of receiving user input through keyboard entry, voice-to-text conversion, gesture-based input, or predictive text systems. The input element 106 spans substantially the full width of the display interface, though in alternative embodiments it may occupy a partial width with additional controls or indicators positioned laterally. The input element 106 may include supplementary controls such as formatting buttons, emoji selectors, attachment options, or submission triggers, which may be integrated within the element boundary or positioned adjacently.

The first comment stream region 104 displays comments from users classified into a first hierarchical group, shown here as Expert Group comments 110 and 112. The classification determining membership in this first hierarchical group may be based on various quantitative thresholds applied to user profile metrics, including but not limited to market capitalization values exceeding predetermined amounts such as $10 billion, gross domestic product values for country-based classifications, revenue thresholds for business entities, follower counts exceeding specified minimums such as 100,000 followers, professional credentials meeting defined scores, or experience levels surpassing established benchmarks. The classification process may be performed by a user classification module implemented as a microservice querying external databases, utilizing API-based verification services, or applying machine learning classifiers to analyze composite user attributes.

The second comment stream region 108 displays comments from users classified into alternative hierarchical groups, illustrated here through Producer Group comment 114 and Consumer Group comment 116. The distinction between Producer and Consumer groups within the second comment stream region 108 demonstrates that multiple sub-hierarchies may exist below the primary threshold, with Producer Group members potentially representing users meeting secondary criteria such as market capitalizations between $1 billion and $10 billion, while Consumer Group members fall below all defined thresholds. These classifications may be dynamically adjusted as user metrics change, with the system capable of real-time reclassification based on updated profile data.

Comments 110 and 112 in the first comment stream region 104 are configured to display with upward visual movement relative to the central input element 106 when newly posted, creating an ascending flow pattern that visually reinforces the hierarchical superiority of this group. Conversely, comments 114 and 116 in the second comment stream region 108 display with downward visual movement from the central input element 106, establishing the opposing directional flow that characterizes the bidirectional architecture. These visual movements may be implemented through CSS animations, JavaScript-based position transitions, or native application animation frameworks, with configurable parameters for animation duration, easing functions, and movement velocity ranging from 50 to 200 pixels per second.

The comment display elements themselves may incorporate various visual indicators to distinguish hierarchical groups, including differentiated background colors, border styles ranging from solid to dashed patterns, typography variations such as font weight or style modifications, icon badges indicating group membership, or opacity levels reflecting user authority. Each comment may include additional metadata displays such as timestamps, user verification badges, interaction counts, or sentiment indicators, which may be positioned within the comment boundaries or as adjacent overlay elements. The comment containers may support rich content including formatted text, embedded images, hyperlinks, code snippets, mathematical notation, or multimedia attachments, with rendering handled by appropriate parsing engines or content transformation pipelines.

The system 100 implements asymmetric viewing permissions wherein users classified into the first hierarchical group can view all comments in both stream regions 104 and 108, while users in lower hierarchical groups may be restricted to viewing only the second comment stream region 108, thereby facilitating controlled knowledge transfer from authority figures to broader audiences while maintaining peer-level discussion privacy. These visibility controls may be enforced through server-side filtering, client-side rendering restrictions, or cryptographic access controls ensuring that restricted content cannot be accessed through interface manipulation.

Figure 2:
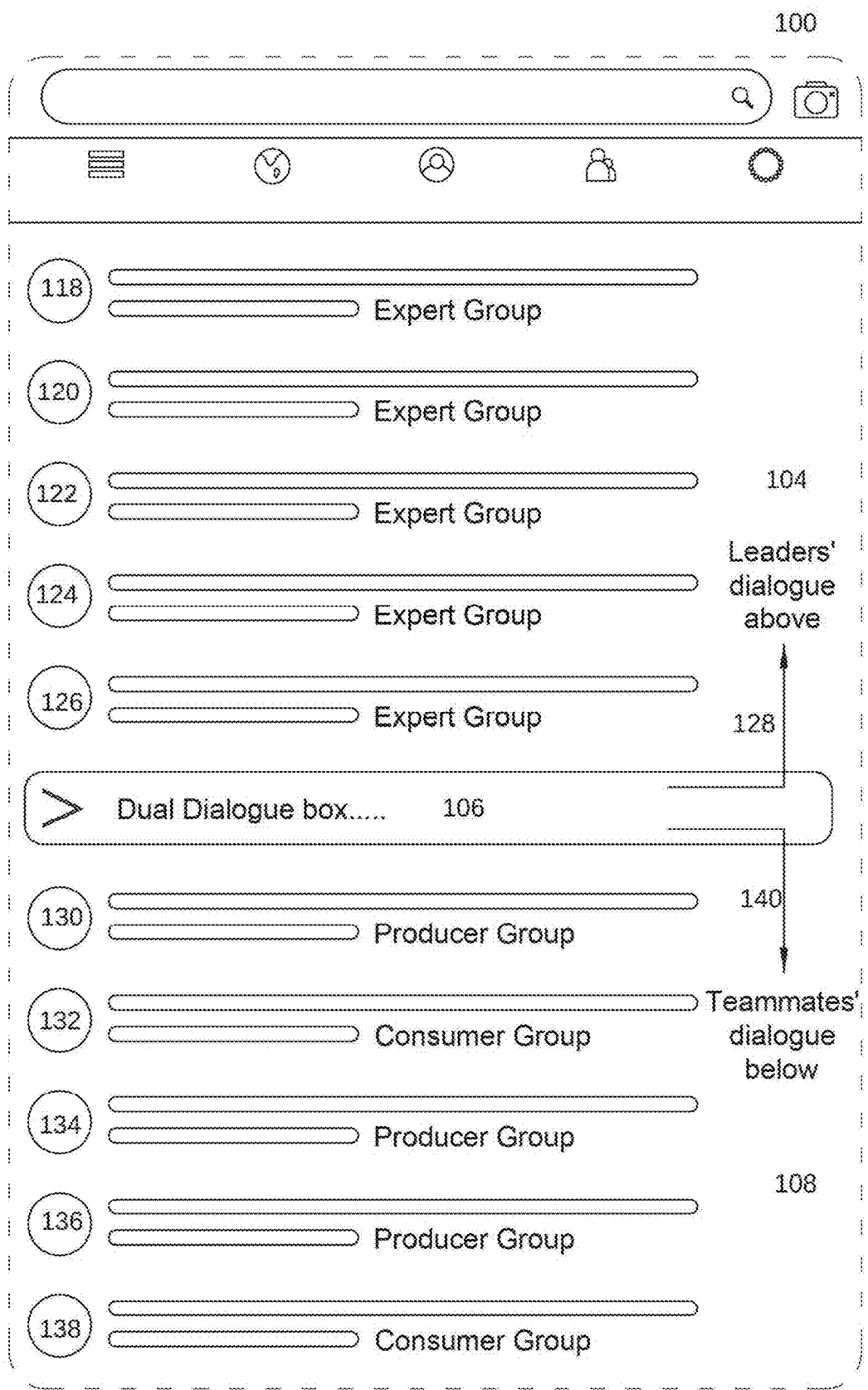
FIG. 2 illustrates an example of the discussion interface system operating as a standalone platform with multiple expert comments flowing upward and mixed producer/consumer comments flowing downward from the central input element.

FIG. 2 illustrates the discussion interface system 100 operating as a standalone commenting platform independent of any overlying content layer, demonstrating the pure architectural implementation of the bifurcated comment flow system. The central input element 106 displays placeholder text reading "Dual Dialogue box . . . " which may be customized to display various prompts such as "Enter your comment," "Join the discussion," "Share your expertise," or dynamically generated prompts based on user classification status such as "Lead the conversation" for Expert Group members or "Ask your question" for Consumer Group members. The input element 106 may support multiple input modes including plain text, markdown formatting, rich text with WYSIWYG controls, or code syntax highlighting for technical discussions, with the input mode potentially varying based on user permissions or discussion context.

The first comment stream region 104 contains Expert Group comments 118, 120, 122, 124, and 126, each representing contributions from users whose profile metrics exceed the primary classification threshold. These thresholds may be implemented as configurable parameters stored in JSON format, XML configuration files, or database tables, allowing system administrators to adjust classification criteria without code modifications. For financial discussions, the threshold might require a market capitalization exceeding $10 billion, while for academic discussions it might require h-index values above 50, or for social media influencer discussions it might require verified follower counts exceeding 1 million. The classification module performing these determinations may cache user classifications in memory using Redis or similar in-memory data stores to reduce database query overhead, with time-to-live values ensuring periodic re-evaluation of user status.

The upward directional flow indicator 128 accompanied by the label "Leaders' dialogue above" provides visual reinforcement of the ascending movement pattern for Expert Group comments. This directional indicator may be rendered as an animated arrow with pulsing effects, a gradient fade suggesting upward motion, or particle effects flowing upward at regular intervals. The movement of comments from the central input element 106 upward into region 104 may be implemented using requestAnimationFrame for smooth 60 fps animations, CSS transforms for GPU-accelerated movement, or physics engines providing realistic acceleration and deceleration curves. The velocity of upward movement may be dynamically adjusted based on comment frequency to prevent visual congestion, with algorithms implementing exponential backoff when comment density exceeds predetermined thresholds.

The second comment stream region 108 displays a heterogeneous mixture of Producer Group comments 130, 134, and 136 alongside Consumer Group comments 132 and 138, illustrating the system's capability to maintain multiple sub-hierarchies within a single visual stream. Producer Group classification may represent intermediate-tier users such as companies with market capitalizations between $1 billion and $10 billion, verified professionals without leadership positions, or content creators with follower counts between 10,000 and 1 million. Consumer Group members may represent general users falling below all established thresholds, though they may still be subject to minimum participation requirements such as email verification, account age minimums, or reputation scores to prevent spam or bot participation.

The downward directional flow indicator 140 with the label "Teammates' dialogue below" emphasizes the descending movement pattern for comments in region 108. This opposing directional flow creates what may be termed a "fountain effect" where content emerges from the central input element 106 and flows outward in both vertical directions, visually representing the dissemination of ideas from a central point of contribution. The downward movement may incorporate gravity-like acceleration effects, with comments appearing to "fall" into place, or may use constant velocity movement for a more mechanical appearance.

Comments may fade in during movement using opacity transitions from 0 to 1 over configurable duration periods, creating a materialization effect as they settle into their final positions.

The visual distinction between Producer Group comments and Consumer Group comments within region 108 may be achieved through various design elements including border color variations with Producer comments using solid borders and Consumer comments using dashed borders, background gradient differences with Producer comments having subtle color gradients while Consumer comments use flat colors, or typographical distinctions such as Producer comments rendering in a medium font weight while Consumer comments use regular weight. These visual differentiators may be defined in CSS stylesheets, inline styles generated dynamically based on user classification, or through component-based styling systems in frameworks like styled-components or CSS-in-JS solutions.

The system's comment routing module determines the placement of each comment based on real-time classification checks, which may involve synchronous validation against cached user data for performance optimization or asynchronous validation with optimistic UI updates that may be reversed if classification changes. The routing logic may implement override mechanisms for special cases, such as system announcements appearing in both streams simultaneously, moderator messages bypassing normal routing rules, or promotional content from verified partners receiving enhanced visibility regardless of standard classification metrics. The routing module may also support keyword-based routing overrides, where comments containing predetermined trigger words such as "URGENT," "ANNOUNCEMENT," or "BREAKING" receive special handling regardless of user classification.

The temporal spacing between comments in each stream region may be dynamically adjusted based on comment velocity, with high-activity periods triggering automatic scrolling or pagination to maintain readability. The system may implement intelligent clustering algorithms that group related comments posted within short time windows, reducing visual redundancy when multiple users respond similarly to the same topic. Comments may be subject to rate limiting on a per-user basis, with Expert Group members potentially having higher rate limits or no limits at all, while Consumer Group members might be restricted to one comment per minute to prevent flooding. These rate limits may be implemented using token bucket algorithms, sliding window counters, or distributed rate limiting across multiple server instances using Redis or similar distributed caching systems.

Figure 3:
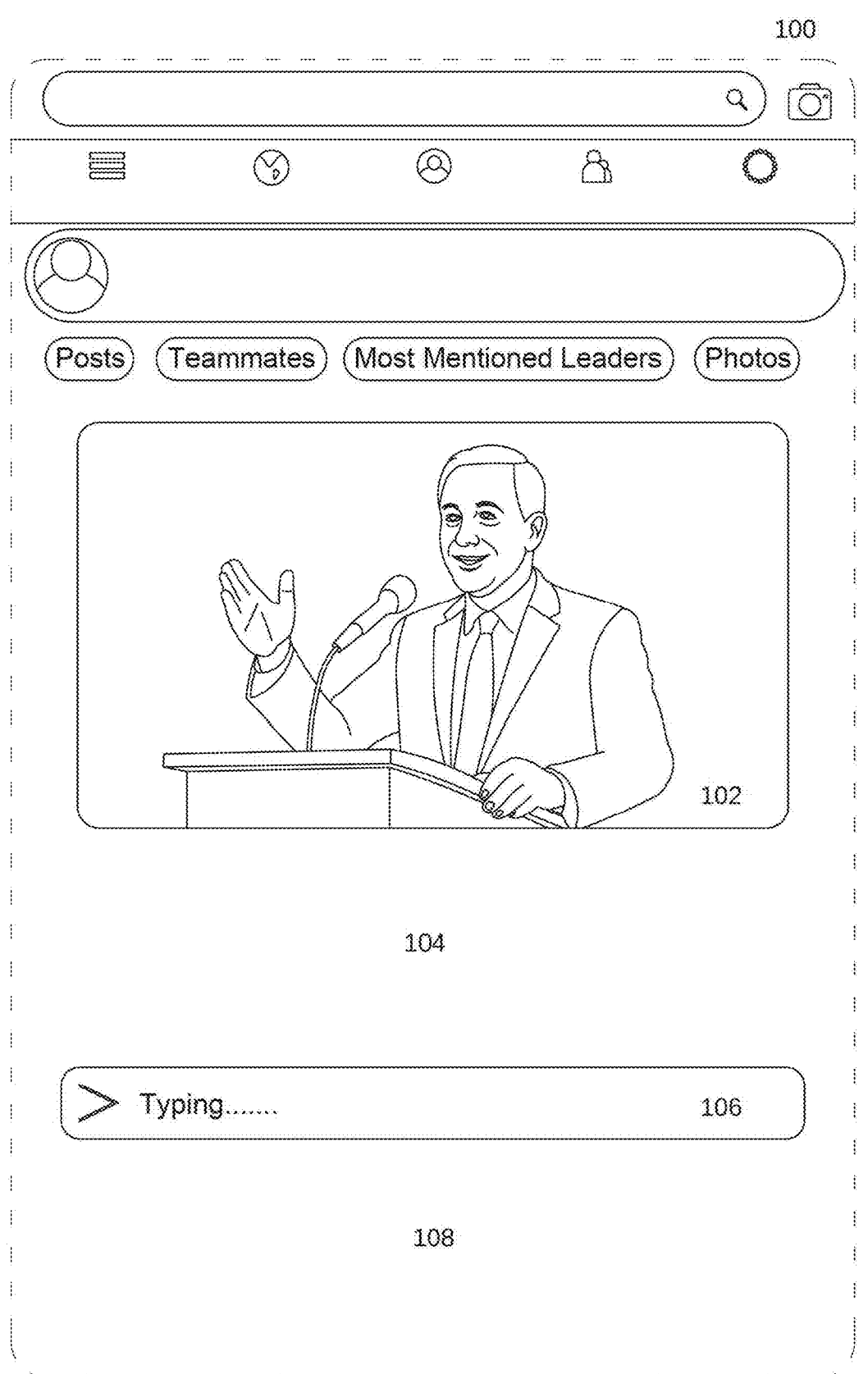
FIG. 3 illustrates an example of the discussion interface system in its initial empty state with the central input element displaying placeholder text between unpopulated comment stream regions.

FIG. 3 illustrates the discussion interface system 100 in its initial empty state, capturing the moment when a user first engages with the bifurcated comment architecture before any discussion has commenced. Building upon the architectural elements established in FIGS. 1 and 2, this figure demonstrates the system's readiness state where the spatial framework awaits population with hierarchically-routed content. The main content display region 102 remains present, maintaining continuity with the deployment context shown in FIG. 1, though as previously noted this region may contain various content types or be replaced with minimal topic indicators in forum-style implementations.

The central input element 106 now displays "Typing . . ." placeholder text, indicating active user engagement with the text entry mechanism. This dynamic placeholder text may be generated through JavaScript event listeners detecting focus events, keypress events, or input events on the element, with the ellipsis potentially animated through CSS animations cycling through different numbers of dots or through a typing indicator animation suggesting active composition. The placeholder text may adapt based on detected user classification status, displaying different prompts such as "Share your expertise . . . " for Expert Group members whose classification has been verified through the user classification module, or "Ask your question . . . " for Consumer Group members seeking knowledge from higher-tier participants. The input element 106 may implement auto-save functionality storing draft content in localStorage or sessionStorage at regular intervals, preventing content loss if the user navigates away or experiences connection interruption.

The first comment stream region 104 appears empty but structurally prepared to receive upward-flowing comments from Expert Group contributors. This empty state may include subtle visual indicators of its purpose, such as watermark text reading "Expert insights will appear here," ghost placeholders showing the expected position of future comments, or animated particles drifting upward to suggest the intended flow direction even before actual comments populate the space. The region 104 may be implemented as a flexbox container with flex-direction set to column-reverse, causing new comments to naturally stack upward, or as a standard container with JavaScript-based positioning calculating appropriate translateY values for each incoming comment. The empty region may maintain minimum height values to preserve interface stability, preventing layout shift when initial comments arrive.

The second comment stream region 108 similarly appears empty but ready to accommodate downward-flowing comments from Producer and Consumer Group members. This region may display different preparatory visual cues such as "Community discussion will appear here" watermarks or downward-drifting animation effects establishing the expected flow pattern. The region 108 may implement overflow handling differently from region 104, with overflow-y set to auto or scroll to accommodate potentially higher comment volumes from the broader user base, while region 104 might use overflow-hidden with programmatic scrolling to maintain focus on recent Expert contributions.

The empty state of both regions 104 and 108 reveals the underlying CSS Grid or Flexbox layout structure that maintains consistent spacing regardless of content presence. The layout may implement responsive breakpoints adjusting the relative heights of regions 104 and 108 based on viewport dimensions, with mobile viewports allocating equal space while desktop viewports might provide more space to region 104 under the assumption that Expert content warrants greater visibility. The empty regions may include connection indicators or WebSocket status displays showing real-time connection state to the server, assuring users that the system is actively listening for new contributions.

During this initial state, the system's comment routing module remains active but idle, with event listeners attached to the central input element 106 awaiting form submission or enter key events. The routing module may pre-fetch the current user's classification status during this empty state, caching the result to enable instantaneous routing when the user submits their first comment. For unauthenticated users, the system may display modified placeholder text such as "Sign in to join the discussion" or implement progressive engagement strategies allowing users to compose comments that prompt authentication only upon submission attempt.

The transition from this empty state to populated states shown in other figures occurs through carefully orchestrated animations when the first comments arrive. The initial comment in region 104 may materialize with enhanced visual effects such as glow effects, scaling animations, or particle emissions to draw attention to the first Expert contribution, establishing the upward flow pattern for subsequent users. Similarly, the first comment in region 108 may appear with distinct animations emphasizing the downward direction, potentially using bounce effects or gravity-simulated drops that settle into position. These initial animations may be more pronounced than subsequent comment additions, serving as visual tutorials teaching users the bidirectional flow pattern.

The empty state may also trigger preparatory processes such as pre-loading user avatars for likely participants based on discussion context, establishing WebRTC connections for potential real-time features, or warming up machine learning models that might be used for comment classification or sentiment analysis. The system may analyze the main content in region 102 during this empty state to predict likely discussion topics, pre-generating relevant keyword filters or topic classifiers that will assist in organizing incoming comments. This preparatory phase ensures optimal performance when discussion activity begins, reducing latency for initial comments and establishing smooth animation framerates from the first interaction.

FIG. 4 illustrates the discussion interface system 100 implementing its recursive nested discussion architecture, demonstrating how the bifurcated comment structure established in previous figures can be replicated within individual comment threads to maintain hierarchical organization at multiple conversation depths. Building upon the populated states shown in FIGS. 1 and 2, and the initialization sequence of FIG. 3, this figure reveals how the system scales to accommodate branching discussions while preserving the fundamental above/below routing paradigm at each nesting level.

The first comment stream region 104 at the parent level displays Expert Group comments 118 and 120, representing the primary tier of discussion as previously described. The reply indicator 142 associated with comment 120 serves as an expansion control that may be implemented as a clickable button, a hover-sensitive region, or a touch-responsive area for mobile interfaces. This indicator may display numerical badges showing reply counts, heat indicators showing discussion activity levels, or preview snippets of the most recent nested responses. The activation of reply indicator 142 may trigger smooth expansion animations using CSS transitions or JavaScript animation libraries, with the nested discussion container 144 expanding downward while maintaining visual continuity with its parent comment.

The nested discussion container 144 establishes a complete secondary instance of the bifurcated architecture within the bounds of a single comment thread. This container may be implemented as an iframe maintaining independent document scope, a shadow DOM element providing style encapsulation, or a standard DOM subtree with carefully scoped CSS classes preventing style inheritance conflicts. The container 144 may inherit certain configuration parameters from its parent context, such as user classification thresholds and animation speeds, while maintaining independent state for properties like scroll position and input focus. The visual boundary of container 144 may be emphasized through border styling, background color differentiation, or subtle drop shadows creating a layered appearance that clearly delineates the nested conversation space.

Within the nested discussion container 144, the nested first comment stream region 146 functions identically to the parent-level region 104 but operates within the confined scope of the specific discussion thread. Expert Group comments 152, 154, and 156 appear within this nested region, representing Expert-tier responses to the parent comment 120. These nested Expert comments maintain the same upward flow pattern relative to the nested central input element 148, creating a consistent visual language across nesting levels. The classification criteria determining Expert status remains constant across nesting levels, ensuring that a user's hierarchical position does not change based on conversation depth, though additional context-specific permissions might apply such as the original comment author receiving elevated privileges within their own thread regardless of global classification.

The nested central input element 148 displays the same "Dual Dialogue box . . . " placeholder text shown in the standalone implementation of FIG. 2, though this text might be contextually modified to reflect the nested nature, such as "Reply to this thread . . . " or "Continue this discussion . . . " The nested input element may support all the same input modalities as the parent-level element, including rich text formatting, media attachments, and @-mention functionality for directing responses to specific participants. The element 148 may implement smart sizing that expands vertically as users type longer responses, while remaining constrained within maximum height limits to prevent excessive layout disruption.

The nested second comment stream region 150 contains Producer Group comments 158 and 162 alongside Consumer Group comment 160, maintaining the same mixed-hierarchy structure demonstrated at the parent level. These comments flow downward from the nested central input element 148, preserving the directional opposition that characterizes the system's visual hierarchy. The relative proportions of Producer versus Consumer comments within nested discussions may differ from parent-level distributions, as focused sub-discussions might attract different participant demographics than the broader conversation. The nesting level may influence rate limiting parameters, with deeper nested discussions potentially having more restrictive limits to prevent conversation fragmentation.

The routing logic for nested comments may implement additional contextual rules beyond standard user classification. For instance, the author of parent comment 120 might automatically have their nested responses routed to the upper stream regardless of their global classification, acknowledging their special relationship to the discussion branch. Alternatively, the system might implement "guest expert" functionality where users can be temporarily elevated within specific threads based on demonstrated knowledge or moderator designation. The nested routing module may also consider thread-specific metrics such as upvote counts, reply engagement rates, or sentiment scores when making routing decisions.

The visual relationship between nested container 144 and its parent comment 120 may be reinforced through various design elements including connecting lines or brackets linking the container to its origin point, gradual color transitions creating visual flow from parent to child, or animated highlights that pulse between parent and nested elements during active discussion. The container 144 may support collapsing back to a minimal state through the reply indicator 142, with collapsed states potentially showing preview information such as participant counts, most recent activity timestamps, or AI-generated thread summaries.

The recursive nature of this architecture enables unlimited nesting depth in theory, though practical implementations may enforce maximum nesting levels to prevent interface complexity and performance degradation. Each nesting level may incrementally reduce available width, naturally limiting useful nesting depth on smaller viewports. The system may implement intelligent flattening algorithms that promote deeply nested discussions back to shallower levels when they achieve sufficient engagement, preventing valuable contributions from being buried in deep thread hierarchies. Mobile implementations might limit nesting to a single level, with deeper discussions opening in modal overlays or separate view contexts to maintain usability on constrained screen dimensions.

The performance implications of recursive nesting are managed through various optimization strategies including lazy loading of nested containers only when expanded, virtual scrolling within nested regions to limit DOM node count, and aggressive memory management releasing unused nested contexts when users navigate away. The system may implement WebSocket connection pooling to prevent excessive connection overhead when multiple nested discussions are active simultaneously, with a single multiplexed connection handling updates across all nesting levels.

FIG. 5 illustrates the discussion interface system 100 in a state of active multi-level engagement, demonstrating how the bifurcated architecture handles concurrent discussions across multiple conversation planes while maintaining hierarchical organization throughout. Building upon the nested architecture introduced in FIG. 4, this figure reveals the system's capacity to sustain parallel discussion threads with varying levels of activity, showcasing both the scalability of the routing mechanism and the visual coherence maintained during complex conversation states.

The main content display region 102 remains visible, anchoring the discussion context while multiple conversation streams unfold below. The first comment stream region 104 contains comments 164 and 166 from Expert Group members at the parent discussion level. These comments may have accumulated over a longer time period than shown in previous figures, with older comments potentially having reduced opacity, compressed vertical spacing, or other visual treatments indicating their age while maintaining readability. The persistence strategy for comments in region 104 may differ from region 108, with Expert contributions retained longer due to their presumed higher value, while Consumer comments might be subject to more aggressive pruning algorithms based on age, engagement metrics, or relevance scores.

Comment 166 displays reply indicator 142, which has been activated to reveal nested discussion container 144. The persistence of this expanded state may be maintained through various state management approaches including URL parameters encoding expansion states, localStorage maintaining user-specific view preferences, or session-based memory of interaction patterns. The expanded container 144 demonstrates an active nested discussion with the nested central input element 148 positioned between nested conversation streams, maintaining the architectural consistency established in FIG. 4.

Within the nested second comment stream region 150, comments 168 and 170 represent ongoing Producer or Consumer Group contributions to the nested thread. The presence of multiple comments in this nested region illustrates how sub-discussions can achieve substantial depth without disrupting the parent-level conversation flow. The nested comments may be subject to different retention policies than parent-level comments, with automatic collapsing after periods of inactivity or when the discussion focus shifts to newer threads. The visual treatment of nested comments might include progressive indentation reduction at deeper levels, preventing excessive horizontal space consumption while maintaining clear hierarchical relationships.

The second comment stream region 108 at the parent level shows robust activity with comments 172, 176, 178, and 180 representing a mixture of Producer and Consumer Group contributions. The higher density of comments in region 108 compared to region 104 reflects the typical participation patterns where broader audience engagement exceeds expert contributions in volume though not necessarily in impact. The spacing between comments in region 108 may be dynamically adjusted based on activity levels, with high-volume periods triggering automatic compression to display more comments within the available viewport, while quiet periods might expand spacing for improved readability.

The presence of additional central input element 174 represents a significant architectural feature where multiple input points may be instantiated within the same interface. This element may appear as a floating action button that maintains position during scrolling, a duplicated input field for user convenience, or a contextual input that appears when users interact with specific comment regions. The routing behavior of element 174 remains consistent with element 106, applying the same user classification logic to determine comment placement. The synchronization between multiple input elements may be maintained through shared state management, ensuring that draft content entered in one element appears in all instances, preventing user confusion and content loss.

The temporal dynamics of the populated interface reveal several operational characteristics of the system. Comments may display relative timestamps such as "2 minutes ago" or "just now" that automatically update through JavaScript intervals or MutationObserver patterns. The system may implement smart batching of incoming comments, accumulating multiple near-simultaneous submissions and inserting them as a group with choreographed animations to prevent visual chaos during high-activity periods. Real-time presence indicators might show which users are currently typing, with ghost previews of pending comments appearing in their destined regions before final submission.

The comment overflow handling in this populated state demonstrates various scrolling strategies. Region 104 might implement reverse infinite scrolling where older Expert comments load automatically as users scroll upward, maintaining a complete historical record of authoritative contributions. Region 108 might use traditional infinite scrolling loading older comments as users scroll downward, with potential filters allowing users to focus on specific time ranges, participants, or content types. The nested container 144 might maintain independent scroll context, allowing users to navigate nested discussions without losing their position in the parent conversation.

The performance optimizations necessary for this level of activity include virtual DOM implementations limiting actual DOM nodes to visible comments plus small buffers, comment pooling and recycling to minimize garbage collection overhead, and image lazy loading for avatar images and embedded media. The system may implement progressive enhancement strategies where basic text content loads immediately while rich media elements load asynchronously. WebSocket connections may use binary protocols like MessagePack or Protocol Buffers for efficient data transmission, with delta updates sending only changed properties rather than complete comment objects.

The moderation workflows in this active state may include automated content filtering applying in real-time before comments appear in their designated regions, with machine learning models trained on community standards identifying potentially problematic content. Expert Group comments might bypass certain filters in recognition of their established credibility, while Consumer Group comments might face stricter scrutiny. Crowd-sourced moderation tools might allow participants to flag inappropriate content, with thresholds varying by user classification level. The system may implement shadow banning capabilities where problematic users see their own comments displayed normally while other users don't receive them, preventing disruption while avoiding explicit confrontation.

FIG. 6 illustrates an alternative visual embodiment of the discussion interface system 100, demonstrating the flexibility of the core architectural principles while implementing distinct aesthetic and functional variations that may be advantageous for different deployment contexts or user preferences. Building upon the functional elements established in previous figures, this embodiment introduces angular design elements and explicit directional indicators that reinforce the bidirectional flow pattern through enhanced visual metaphors while maintaining the fundamental hierarchical routing architecture.

The main content display region 102 and central input element 106 retain their core positioning and functionality as established in previous embodiments, ensuring architectural consistency across visual variations. The central input element 106 may implement the same text entry capabilities, user classification checking, and routing logic as previously described, with only the visual presentation layer modified to complement the alternative aesthetic approach. This separation of presentation from functional logic exemplifies proper software architecture principles, allowing multiple visual themes or skins to be applied without modifying core system behavior.

The first comment stream region 104 displays Expert Group comments 184 and 188 with modified container shapes featuring angular or pointed edges rather than the rounded rectangles shown in previous figures. These angular containers may be implemented through CSS clip-path properties defining polygonal shapes, SVG elements with custom path definitions, or canvas-based rendering for more complex geometries. The pointed edges might specifically orient toward the central input element 106, creating visual arrows that reinforce the origin point of the comments, or might point upward to emphasize the ascending flow pattern. The angular design may convey different semantic meanings in different contexts, such as suggesting authority and decisiveness for Expert comments, or indicating priority and urgency in time-sensitive discussions.

Visual indicators 182 and 186 extend from comments 184 and 188 respectively, appearing as arrows or connectors that explicitly illustrate the downward origin of these comments from the central input element 106 despite their current position above it. These indicators may be rendered as CSS pseudo-elements using border tricks to create triangular shapes, SVG arrows with customizable stroke patterns and arrowhead styles, or animated elements that pulse or flow to suggest active movement. The indicators might appear only on hover to reduce visual clutter, or might be permanently visible but with varying opacity based on comment age or relevance. The directional nature of these indicators serves as a visual teaching mechanism, helping new users immediately understand that Expert comments originate from the central input and flow upward.

The second comment stream region 108 contains Producer Group comment 192 and Consumer Group comment 196, also featuring the alternative angular container design. The consistency of the angular aesthetic across both stream regions maintains visual cohesion while the directional indicators differentiate the flow patterns. The specific angles used in the container shapes might vary between hierarchical groups, with Expert comment containers having sharper, more authoritative angles while Consumer comment containers use gentler slopes suggesting approachability. The angular designs might be implemented responsively, with angle degrees adjusting based on viewport width to maintain visual balance across different screen sizes.

Visual indicators 190 and 194 point upward from comments 192 and 196 respectively, creating a mirror image of the indicators in the upper stream. These upward-pointing indicators emphasize that comments in region 108 originate from the central input element 106 and flow downward, with the indicators pointing back toward their source. The visual symmetry between upward indicators in the lower region and downward indicators in the upper region creates a cohesive visual system that immediately communicates the bidirectional architecture to users. The indicators might incorporate additional information through their visual properties, such as using thickness to represent comment engagement levels, color gradients to indicate sentiment, or animation speed to suggest conversation velocity.

The color scheme in this alternative embodiment might differ from standard implementations, potentially using higher contrast combinations for improved accessibility, monochromatic schemes for professional deployments, or dynamic themes that adjust based on time of day or user preferences. The angular design elements might cast shadows or have depth effects creating a layered appearance, with Expert comments appearing to float above the interface while Consumer comments appear embedded within it. The system might support user-selectable themes allowing individuals to choose between rounded and angular designs based on personal preference or accessibility needs.

The animation behaviors in this angular embodiment might emphasize the geometric nature of the design through crystalline formation effects when new comments appear, shattering or fragmentation effects when comments are removed, or origami-like folding animations during state transitions. The movement of comments from the central input element to their final positions might follow more mechanical, linear paths rather than organic curves, reinforcing the structured nature of the hierarchical system. Transition timing functions might use steps or linear progressions rather than ease-in-out curves, creating a more digital, precise feeling to the interface interactions.

This alternative embodiment might be particularly suitable for certain deployment contexts such as financial or legal discussions where angular designs convey precision and authority, technical or engineering forums where geometric aesthetics align with user expectations, or gaming communities where angular designs match established visual languages. The flexibility to switch between visual embodiments while maintaining consistent functionality allows the system to adapt to different brand requirements, cultural preferences, or industry standards without requiring architectural modifications.

The implementation of multiple visual embodiments may be managed through CSS custom properties allowing theme switching without JavaScript intervention, React/Vue/Angular components with swappable presentation layers, or design tokens systems enabling consistent updates across multiple platforms. The system might detect user preferences through media queries for prefers-reduced-motion or prefers-contrast settings, automatically selecting appropriate visual embodiments that match accessibility needs. A/B testing frameworks might deploy different visual embodiments to different user cohorts, measuring engagement metrics to optimize the default presentation for specific audiences.

CONCLUSION

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the . . . of the invention have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A computer-implemented discussion interface system comprising:

a display screen configured to present a graphical user interface;

a processor configured to execute instructions that cause the graphical user interface to display:

a first comment stream region positioned in an upper portion of the graphical user interface, a second comment stream region positioned in a lower portion of the graphical user interface, and an input element positioned between the first comment stream region and the second comment stream region;

a user classification software component analyzing user profile data and assigning each user to one of at least two hierarchical groups based on at least one classification criterion;

a comment routing software component:

receiving text input from a user through the input element, determining a hierarchical group assignment of the user, and directing display of the text input as a comment to either the first comment stream region or the second comment stream region based on the determined hierarchical group assignment;

wherein comments from users assigned to a first hierarchical group are displayed in the first comment stream region with visual movement in a first vertical direction relative to the input element, and comments from users assigned to a second hierarchical group are displayed in the second comment stream region with visual movement in a second vertical direction opposite to the first vertical direction relative to the input element; and wherein the system is configured to enable users from both of the at least two hierarchical groups to view comments displayed in both the first comment stream region and the second comment stream region while restricting comment submission through the input element based on each user's hierarchical group assignment.

2. The system of claim 1, wherein the at least one classification criterion comprises a quantitative threshold value applied to a numerical metric extracted from the user profile data.

3. The system of claim 2, wherein the numerical metric comprises at least one of: a market capitalization value, a gross domestic product value, a revenue value, an asset value, a follower count, a subscriber count, an experience level indicator, or a credential score.

4. The system of claim 1, wherein the first hierarchical group represents users having a metric value above a predetermined threshold and the second hierarchical group represents users having a metric value below the predetermined threshold.

5. The system of claim 1, wherein the comment routing software component further applies a temporal delay between receipt of the text input through the input element and display of the comment in a determined comment stream region.

6. The system of claim 1, wherein the input element comprises a text entry field spanning horizontally across a width of the graphical user interface between the first comment stream region and the second comment stream region.

7. The system of claim 1, wherein comments in the first comment stream region move upward from the input element and comments in the second comment stream region move downward from the input element.

8. The system of claim 1, further restricting viewing permissions such that users assigned to the first hierarchical group can view comments in both comment stream regions while users assigned to the second hierarchical group can view comments in the second comment stream region.

9. The system of claim 1, further:

detecting selection of a comment displayed in either comment stream region; and generating a child discussion interface comprising a secondary first comment stream region, a secondary second comment stream region, and a secondary input element positioned therebetween.

10. The system of claim 9, further maintaining hierarchical group assignments from a parent discussion level when routing comments in the child discussion interface.

11. The system of claim 1, further applying visual transitions to comments as comments enter and move through respective comment stream regions, wherein the visual transitions include at least one of: fade-in effects, sliding motions, scaling transformations, or opacity changes.

12. The system of claim 1, wherein the system further dynamically adjusts a relative display area allocation between the first comment stream region and the second comment stream region based on a volume of comments in each comment stream region.

13. The system of claim 1, further authenticating user profile data before assigning the user to a hierarchical group.

14. The system of claim 1, further:

parsing the text input for predetermined keywords; and overriding hierarchical group-based routing when specified keywords are detected.

15. The system of claim 1, further reviewing and approving comments from users in the second hierarchical group before displaying comments from users in the second hierarchical group in the second comment stream region while allowing display of comments from users in the first hierarchical group.

16. The system of claim 1, wherein the graphical user interface further comprises visual indicators distinguishing comments from users in different hierarchical groups within each comment stream region.

17. The system of claim 16, wherein the visual indicators comprise at least one of:

color coding, border styling, background shading, icon badges, or typography variations.

18. The system of claim 1, further:

tracking interaction metrics for comments in each comment stream region; and displaying aggregate statistics.

19. The system of claim 1, further periodically re-evaluating user profile data and dynamically reassigning users between hierarchical groups based on updated classification criterion values.

20. The system of claim 1, further visually linking related comments between the first comment stream region and the second comment stream region through graphical connectors that span across the input element.

\* \* \* \* \*